United States Patent [19]

Nitschke

[11] 4,140,486

[45] Feb. 20, 1979

[54] SPRING END CAP FOR CONVEYOR ROLLS

[76] Inventor: Norman C. Nitschke, 9102 Buck Rd., Perrysburg, Ohio 43551

[21] Appl. No.: 803,491

[22] Filed: Jun. 6, 1977

[51] Int. Cl.² ............................................. F27D 3/00
[52] U.S. Cl. .................................. 432/246; 198/780; 432/236
[58] Field of Search ............... 432/236, 246; 198/780; 65/348

[56] References Cited

U.S. PATENT DOCUMENTS

| 2,393,471 | 1/1946 | Johnson | 198/780 |
| 3,485,618 | 12/1969 | Ritter, Jr. | 65/223 |

Primary Examiner—John J. Camby
Attorney, Agent, or Firm—Reising, Ethington, Barnard, Perry & Brooks

[57] ABSTRACT

A spring end cap for use in rotatably driving a glass conveyor roll of ceramic is disclosed as incorporating helical spring coils that clamp onto an end of the roll. Each spring coil has a diameter in an undeflected condition slightly less than the diameter of the roll end so that coil deflection increasing the coil diameter allows the coils to receive the roll end prior to being released in order to clamp over a round outer surface of the end. Different embodiments of the end cap are utilized with frictionally driven rolls as well as with toothed sprocket or gear driven rolls. Ease of installation is achieved when the spring coils are all part of a single helical spring. The end cap can also be utilized to repair a broken roll end and then must include at least three helical springs whose coils are axially threaded so as to provide circumferentially spaced clamping that secures the broken roll end to the rest of the roll at the fracture.

18 Claims, 12 Drawing Figures

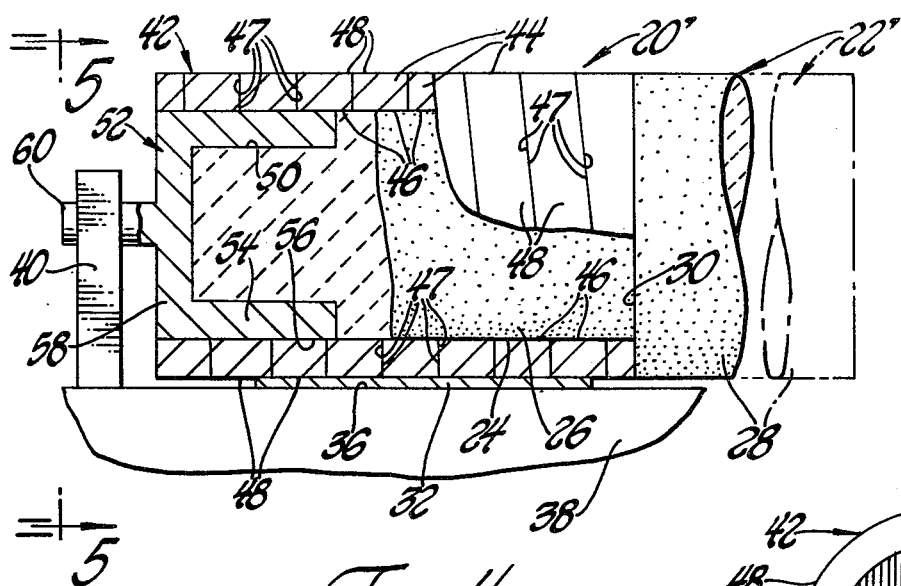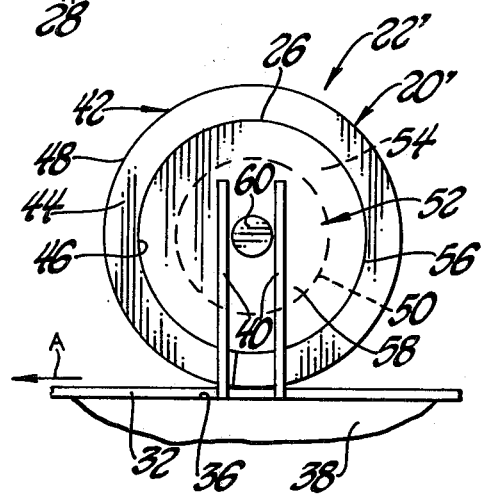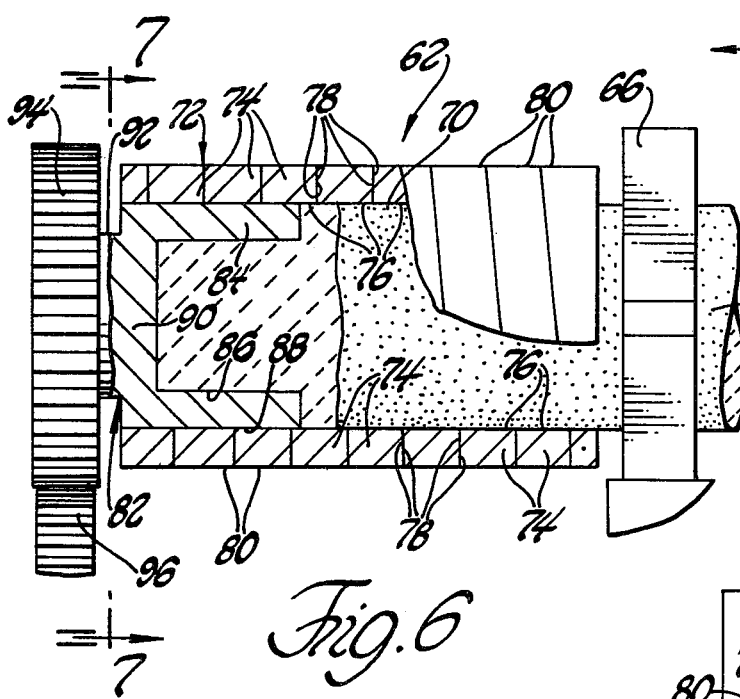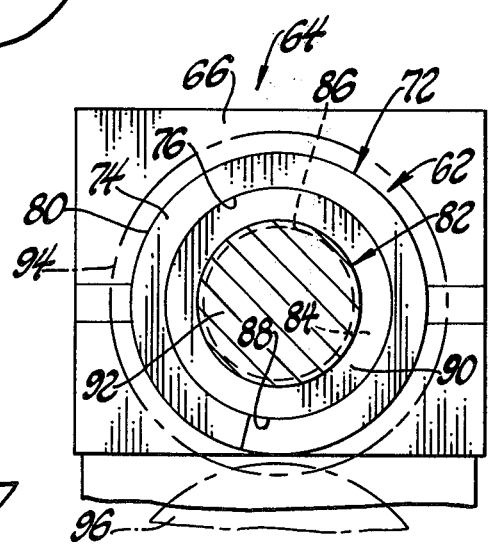

SPRING END CAP FOR CONVEYOR ROLLS

BACKGROUND OF THE INVENTION

1. Field of the Invention

This invention relates to end caps used for driving glass conveyor rolls made of ceramic.

2. Description of the Prior Art

Glass tempering and annealing furnaces conventionally include conveyors for carrying glass sheets during tempering and annealing of the glass. One type of conveyor utilized to carry the glass includes horizontally extending conveyor rolls of ceramic on which the heated glass sheets are supported. Rotary driving of the rolls conveys the glass over the rolls through a heating chamber of either a tempering furnace or an annealing lehr. One ceramic material utilized to form the rolls is a sintered fused silica that is made by grinding solid fused silica into small particles and then sintering these particles to each other at a temperature below the fusing temperature. Such a material is readily formed into an elongated shape of the rolls and has a relatively small coefficient of thermal expansion which is advantageous due to the extreme temperatures to which the rolls are subjected during use.

One conventional way for rotatably supporting and driving heated glass conveyor rolls of ceramic utilizes spaced bearings that support opposite ends of the rolls and a drive member having a toothed drive component such as a gear or a chain sprocket through which the roll is driven at one end of the roll. A metallic end cap is conventionally utilized to secure the drive gear or chain sprocket to the roll end. In another type of heated glass conveyor disclosed by U.S. Pat. No. 3,806,312 and subsequent U.S. Pat. Nos. 3,934,970 and 3,947,242, opposite ends of the conveyor rolls are supported and rotatably driven by continuous drive belts or chains in a frictional manner. Metallic end caps are also utilized with this type of conveyor roll to prevent wear at the ends of the roll where the frictional driving takes place.

Metallic end caps for use in driving ceramic rolls that convey heated glass have been conventionally secured to the roll ends in two different ways. A suitable adhesive bond between the roll end and the end cap has been utilized to some extent in providing the end cap securement. Heat shrinking the end cap onto the roll end has also been utilized in securing the end cap. In performing the latter securement, the end cap is heated to a very high temperature so that the diameter of a sleeve portion thereof increases prior to receiving the roll end and being cooled so as to heat shrink onto the roll end. In performing this heat shrinking securement, the internal diameter of the end cap sleeve portion and the diameter of the associated roll end must be closely matched so that the roll end is small enough to be inserted into the heated end cap sleeve portion but large enough to be securely clamped thereby after the cooling. Often, machining of the end cap sleeve portion and/or the roll must be performed in order to provide this matching. Roll ends with end caps heat shrunk thereon project outwardly from the glass furnace or annealing lehr to a location where the temperatures involved are not relatively high such that the end caps are not heated sufficiently to increase the diameter of their sleeve portions and loosen the clamping pressure that secures them to the roll. At the location where each cap sleeve portion terminates, the roll is subjected to the clamping pressure of the sleeve portion and has an adjacent portion which is free of this clamping pressure. At this location, the roll ends sometimes fracture due to the stresses involved.

While end caps for heated glass conveyor rolls of ceramic constructed according to this invention utilize helical spring coils with a construction that is hereinafter described, it should be noted that helical springs have been utilized with conveyor rolls heretofore as disclosed by U.S. Pat. Nos. 3,485,615, 3,485,618, 3,527,589, and 3,881,906.

SUMMARY OF THE INVENTION

An object of the present invention is to provide an improved end cap for a glass conveyor roll of ceramic wherein the end cap includes at least one metallic helical spring having metallic coils with round inner surfaces that are sized to be deflectably clamped onto an associated roll end. In an undeflected condition, the spring coils each have an inner surface diameter just slightly less than the diameter of the outer surface on the roll end such that the coils can be deflected to increase their inner surface diameters to receive the roll end prior to being released and clamped over the outer surface of the roll end.

Different embodiments of end caps constructed according to the invention are utilized with both frictionally driven rolls and positively driven rolls having toothed drive components. Ease of assembly is achieved when a single spring is utilized to provide the coils of the end cap. The end cap can also be utilized to repair a broken roll end at a fracture and then must include at least three helical springs whose coils are threaded axially with each other so that circumferentially spaced support is provided at the roll end fracture.

Each of the preferred embodiments disclosed has spirng coils with round inner and outer surfaces of cylindrical shapes. Also, flat axially facing surfaces of the coils are engaged with each other so that the inner and outer surfaces are contiguous along the roll end.

The frictionally driven embodiments of the spring end cap disclosed have the metallic spring coils located within an undercut in the roll end. Each spring coil of the end cap in these embodiments has a round cylindrical outer surface which is frictionally driven and of the same diameter as the outer surface of the rest of the roll so that the speed of glass conveyance is the same as the speed at which the end cap is frictionally driven. One frictionally driven embodiment of the end cap and each embodiment thereof driven by a toothed drive component incorporates a drive fitting having an axial sleeve portion received within an undercut in the outer surface of the extreme end portion of the roll end. An outer surface of this sleeve portion is clamped by the spring coils to secure the drive fitting to the roll. A drive member projects axially from the sleeve portion away from the end roll in each of these embodiments. In the frictionally driven end cap embodiment, the drive member comprises a pin used to locate the roll during the frictional driving and the undercut that receives the sleeve portion of the drive fitting is a secondary undercut along the undercut which receives the spring coils. In the positively driven roll end cap embodiments, the drive member supports a toothed drive component such as a gear or a chain sprocket through which the roll is rotatably driven.

The objects, features and advantages of the present invention are readily apparent from the following detailed description of the preferred embodiments taken in connection with the accompanying drawings.

BRIEF DESCRIPTION OF THE DRAWINGS

FIG. 4 is a partially sectioned side elevation view of another frictionally driven embodiment of the spring end cap;

FIG. 5 is an end view of the spring end cap shown in FIG. 4 taken along line 5—5 thereof;

FIG. 6 is a partially sectioned side elevation view of a positively driven embodiment of the spring end cap;

FIG. 7 is an end view taken partially in section of the spring end cap embodiment shown in FIG. 6 taken along line 7—7 thereof;

DETAILED DESCRIPTION OF THE PREFERRED EMBODIMENTS

Each preferred embodiment of the spring end cap hereinafter described includes metallic spring coils of steel and is utilized with a heated glass conveyor roll made of a ceramic material. By way of example, this ceramic material may be a sintered fused silica wherein solid fused silica is ground into small particles which are then sintered at a temperature below the fusing temperature to bond the particles to each other in a manner that readily forms the roll shape. Excellent thermal properties are present with conveyor rolls of this type in that the rolls have a relatively small coefficient of thermal expansion as well as the requisite strength to support heated glass sheets being conveyed horizontally along a planar path.

Figure 1:
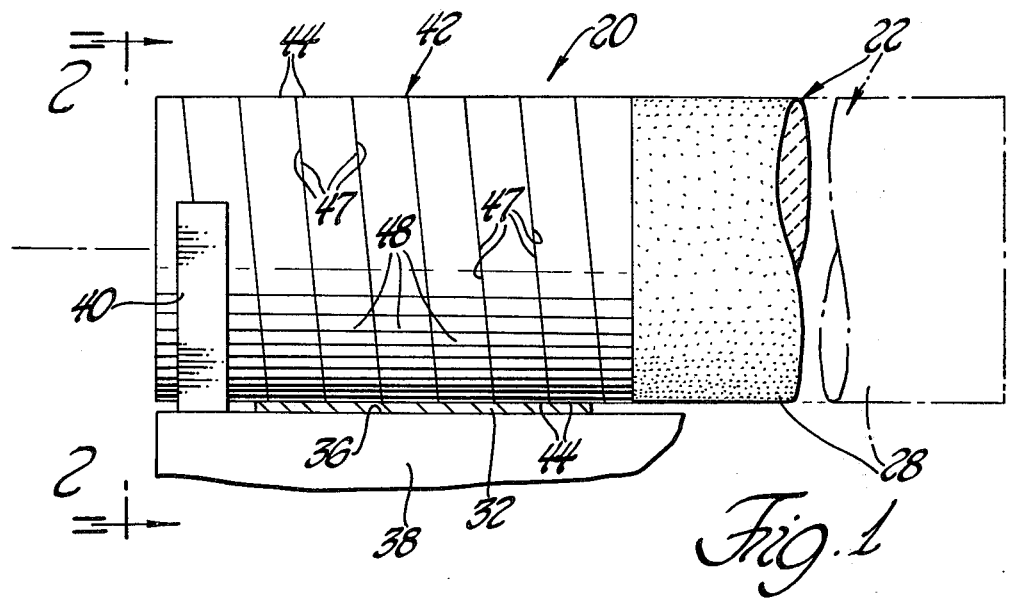
FIG. 1 is a side elevation view of a heated glass conveyor roll of ceramic that includes a frictionally driven spring end cap constructed according to the present invention.
Figure 2:
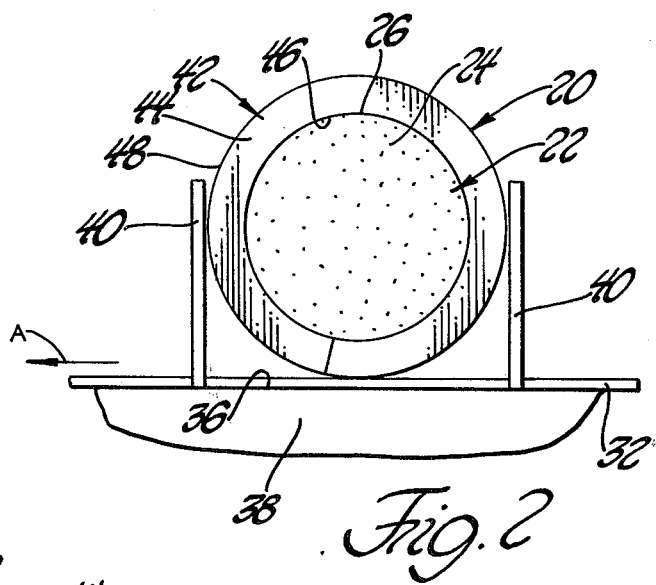
FIG. 2 is an end view of the roll end cap taken along line 2—2 of FIG. 1.
Figure 3:
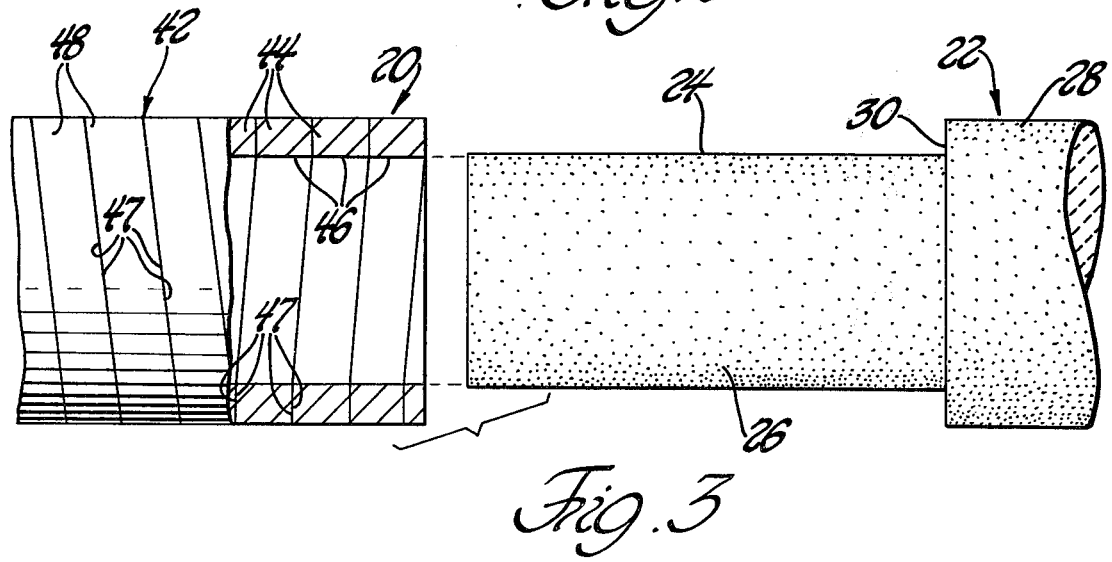
FIG. 3 is a partial view of the end cap and roll end of FIGS. 1 and 2 shown prior to securement of each to the other.

With reference to FIGS. 1-3, one embodiment of the spring end cap is indicated by 20 and is utilized with a ceramic conveyor roll 22. An end 24 of roll 22 is shown in FIGS. 2 and 3 as having an outer surface 26 over which the end cap 20 is mounted during assembly. An undercut in the roll end 24 is defined by the outer surface 26 which has a smaller diameter than the outer surface 28 on the rest of the roll. An axially facing surface 30 of an annular shape extends between the inner and outer surfaces 26 and 28 and faces toward the end cap 20.

Roll 22 shown in FIGS. 1-3 is of the frictionally driven type supported on the upper side of a continuous steel drive belt 32, although a drive chain could also be utilized. Drive belt 32 is slidably driven over the upper surface 36 of a support member 38. Positioning projections 40 extend upwardly from the support member 38 on opposite sides of the roll end cap 20 and locate the roll 22 so that driving of the belt 32 along the direction of arrow A shown in FIG. 2 rotates the roll in a clockwise direction. Roll 22 has another end (not shown) with a similar end cap and belt drive structure so that glass can be conveyed along the outer roll surface 28 between its end during the belt driving, i.e. from the left to the right as shown in FIG. 2.

The end cap 20 in FIGS. 1-3 includes a helical spring 42 of steel having a number of coils 44 that are received within the undercut that is defined in the roll end 24 along its reduced diameter outer surface 26. Spring coils 44 have round inner surfaces 46 of cylindrical shapes, as shown, with diameters in an undeflected condition of the spring just slightly smaller than the diameter of the round outer surface 26, i.e. on the order to ten to fifty thousandths or so. During mounting on the roll end surface 26, the coils 44 of spring 42 are deflected either manually or with a suitable tool to increase their diameters sufficiently so that the roll end 24 can be inserted within the spring. After such insertion, the spring coils 44 are released so that their inner surfaces 46 deflect inwardly and thereby clamp on the roll end. Axially facing surfaces 47 of the spring coils 44 are disclosed as being flat and engaged with each other so that the inner surfaces 46 of the coils are contiguous along the roll end and thereby clamp over the total area of outer roll end surface 26. Round outer surfaces 48 of the spring coils 44 have cylindrical shapes extending between the axially facing surfaces 47 and have diameters in the assembled condition equal to the diameter of the outer surface 28 on the intermediate roll portion between its ends. As such, glass conveyance along the roll is at the same rate the belt 32 is slidably driven along the support member upper surface 36.

With reference to FIGS. 4 and 5, another frictionally driven embodiment of the spring end cap is indicated by numeral 20' and is utilized with a ceramic conveyor roll 22' used to convey sheets of heated glass. Much of the description applicable to the spring end cap and conveyor roll of FIGS. 1-3 is applicable to this other frictionally driven embodiment and, as such, like reference numerals are applied to the different portions of both end caps and their associated rolls except as is noted.

At the extreme end portion of the roll end 24 on the roll embodiment shown in FIGS. 4 and 5, a round outer surface 50 (FIG. 4) of the roll defines a secondary undercut which has a smaller diameter than the outer surface 26 of the roll end defining the main undercut that receives the spring coils 44 of spring 42. A drive fitting 52 of the end cap has an annular sleeve portion 54 that is inserted over the secondary undercut roll surface 50 prior to mounting of the spring on the roll end. A round outer surface 56 of sleeve portion 54 has the same diameter as the roll end outer surface 26, just slightly greater than the undeflected condition of the spring coil inner surfaces 46 prior to assembly. During the assembly the outwardly deflected spring coils 44 are released over the sleeve portion 54 of the drive fitting as well as over the outer surface 26 of the roll end so that the drive fitting 52 is clamped on the roll. An end wall 58 of the drive fitting 52 has a central axially projecting drive member in the form of a positioning pin 60 projecting away from the roll end between the positioning projections 40 which are spaced somewhat closer to each other than the projections of the previously discussed embodiment. Cooperable action between the positioning pin 60 and the projections 40 thus positions the roll 22' with respect to the drive belt 32 as it is slidably driven along the support member upper surface 36 to rotate the roll in a clockwise direction and convey glass along the top of the roll from the left toward the right. Clamping over the total area of the roll end outer surface 26 and the outer surface 56 of sleeve portion 54 is accomplished by the coil inner surfaces 46 as a result of the engagment between the axially facing surfaces 47 on the coils and the consequent contiguous relationship of the coil inner surfaces in the clamped condition after assembly. The outer surfaces 48 of the spring coils likewise are contiguous and have the same diameter as the outer surface 28 of the rest of the roll so that the glass is conveyed at the same rate as the rate of belt movement.

With reference to FIGS. 6 and 7, another embodiment of the spring end cap is indicated by 62 and is utilized with a ceramic roll 64 for conveying heated glass. A pair of spaced pillow block bearings 66 (only one shown) support opposite ends of the roll 64 so that glass can be conveyed over the rolls while engaging the top side of a round outer roll surface 68 (FIG. 6). At the roll end 70 shown, the end cap 62 includes a helical spring 72 of steel with coils 74 that are deflected over the roll outer surface 68. Each coil has a round inner surface 76 of a cylindrical shape, as shown, with a diameter in an undeflected condition just slightly smaller than the diameter of roll surface 68. During assembly, the coils 74 of spring 72 are deflected to increase the diameter of their inner surfaces 76 so that the spring can receive the roll end 70 prior to the coils being released to clamp over the roll outer surface 68. Flat axially facing surfaces 78 of the coils are engaged with each other so that the inner surfaces 76 are contiguous and thereby provide complete clamping over the roll end outer surface 68. Round outer surfaces 80 of the spring coils 74 have cylindrical shapes and are contiguous between the ends of the spring 72 with a diameter that is larger than the roll outer surface 68.

As seen in FIG. 6, a drive fitting 82 has an axial sleeve portion 84 of an annular shape that is received within an undercut defined in the extreme end portion of roll end 70 by a reduced diameter outer surface 86. A round outer surface 88 of sleeve portion 84 has the same diameter as the roll outer surface 68 so that the spring coils 74 clamp the drive fitting 84 to the roll during assembly. An end wall 90 of drive fitting 82 has an axially projecting drive member in the form of a stud shaft 92 projecting away from the roll end with a toothed drive component in the form of a gear 94 supported on the shaft. A toothed drive gear 96 is meshed with gear 94 to provide rotation thereof that rotates the drive fitting end cap so that the roll 64 is driven about its axis of bearing supported rotation.

Figure 8:
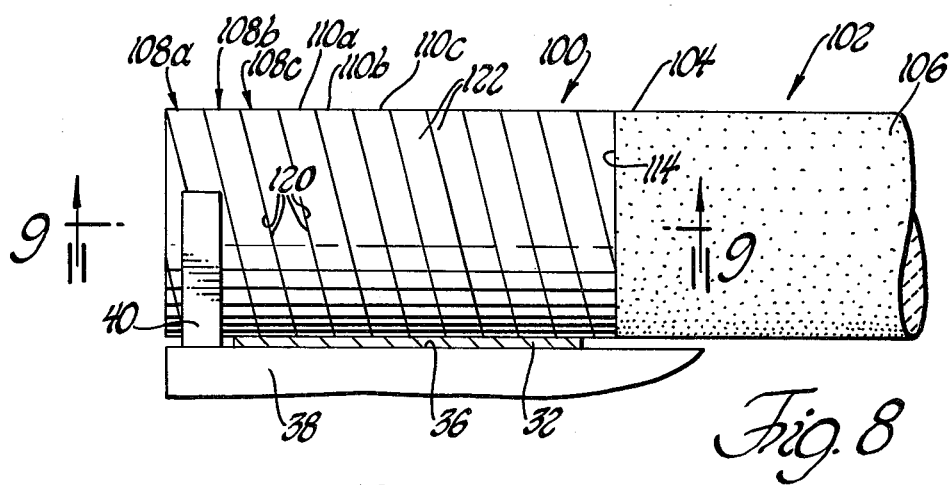
FIG. 8 is a side elevation view of a further frictionally driven embodiment of the spring end cap utilized to repair a broken roll end as well as providing an end cap.
Figure 9:
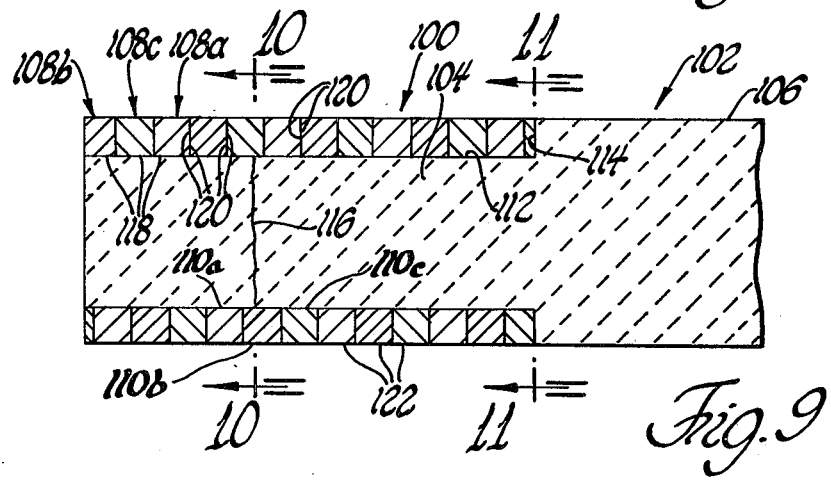
FIG. 9 is a sectional view of the FIG. 8 end cap taken along line 9—9 thereof.

With reference to FIGS. 8 and 9, another embodiment of the spring end cap is indicated by 100 and utilized with a ceramic conveyor roll 102 for conveying heated glass between opposite ends 104 of the roll which are each frictionally driven in the same manner although only one end is shown. Roll 102 has a round outer surface 106 between its ends over which glass is conveyed on the upper side of the roll. A continuous drive belt 32 or a suitable continuous drive chain is slidably driven over the upper surface 36 of the support member 38 with the roll end cap 100 resting on the belt between a pair of positioning projections 40 (only one shown) extending from the support member. Driving of the belt 32 frictionally drives the roll 102 through the end cap 100 in the same manner discussed in connection with the two embodiments shown in FIGS. 1–3 and in FIGS. 4 and 5.

The spring end cap 100 shown in FIGS. 8 and 9 includes three helical springs 108a, 108b, and 108c of steel. The helical springs include coils 110a, 110b, and 110c that are axially threaded with each other so as to be located in an axially sequential relationship as best seen by the crossed hatched sectional view of FIG. 9. It will be noted that the spring coils are located within an undercut that is defined by a reduced diameter outer surface 112 of the roll end 104. An axially facing surface 114 has an annular shape and connects the surface 112 with the outer surface 106 of the rest of the roll. Between the axial surface 114 and the extreme end portion of the roll end 104, a fracture 116 of the roll end is repaired by the cooperative action of the end cap springs 108a, 108b, and 108c. This roll fracture 116 shown would have been formed by a heat shrunk metallic end cap whose sleeve portion extended inwardly from the end of the roll and terminated adjacent the location of the fracture. Prior to assembly of the spring end cap 100 shown, the roll undercut defined by outer surface 112 would have terminated at the fracture 116 and the roll would thus have to be machined to extend this undercut outer surface to the axial surface 114 shown in order to permit the repair of the broken roll portions.

As seen in FIG. 9, each spring coil 110a, 110b, and 110c has a respective round inner surface 118 that has a cylindrical shape with a diameter in an undeflected condition prior to assembly just slightly smaller than the diameter of the roll end outer surface 112 defining the undercut. During assembly, the springs are deflected to increase the diameters of their inner surfaces 118 so that the roll end 104 can be inserted within the springs with the roll portions mated at the irregular interfaces defined by the fracture 116. Release of the springs allows the coils to deflect inwardly over the broken roll portions to provide a clamping action that secures the roll portions to each other. Flat axially facing surfaces 120 of the spring coils are engaged with each other so that the inner surfaces 118 of the coils are contiguous along the roll end outer surface 112 in order to provide clamping over the total area of roll end surface 112. Round outer surfaces 122 of the spring coils have cylindrical shapes with the same diameter in the assembled condition as the outer surface 106 of the roll so that the glass is conveyed along the roll at the same rate as the rate of belt movement over the support member surface 36.

Figure 10:
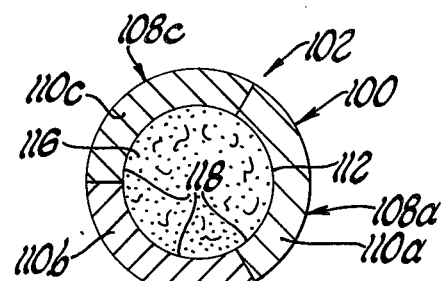
FIG. 10 is a sectional view taken along line 10—10 of FIG. 9 at a fracture of the roll end.
Figure 11:
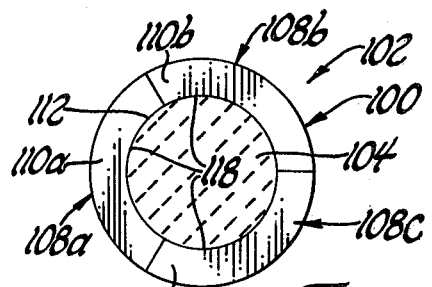
FIG. 11 is a sectional view taken along line 11—11 of FIG. 9.

As seen in FIGS. 10 and 11, the three springs 110a, 110b, and 110c at each cross-sectional location of the roll 102 have a circumferentially spaced relationship with the adjacent coil of each spring extending thereabout for 120°. At the fracture 116 shown in FIG. 10, the spring coils 110a, 110b, and 110c thus provide support against any direction of bending between the interconnected roll portions on each side of the fracture. At least circumferentially spaced springs are necessary in order to provide this circumferentially spaced support. One or two springs would not provide such support; however, four or more springs would provide the support but it should be noted that the manipulations involved with axially threading more than three springs with each other and deflecting the springs during assembly makes the use of three springs preferable.

Figure 12:
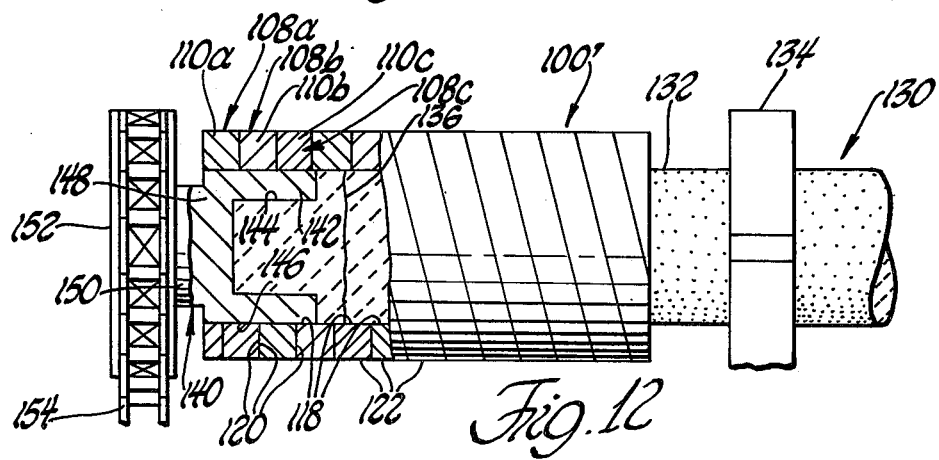
FIG. 12 is a side elevation view taken partially in section of a further positively driven embodiment of the spring end cap which also repairs a broken roll end.

With reference to FIG. 12, another embodiment 100' of the spring end cap is utilized with a ceramic conveyor roll 130 whose opposite ends 132 (only one shown) are supported by associated pillow block bearings 134. Roll end 132 has a fracture 136 that is repaired by three steel helical springs of this end cap in the same manner described in connection with the embodiment of FIGS. 8-11. As such, the springs of end cap 100' have the same reference numerals as do the portions thereof and much of the previous description is applicable. A round outer surface 138 of the roll is clamped by the springs of end cap 100' after the springs are deflected to increase their inner surface diameters and then released so as to clamp over and repair the broken roll portions in the same manner as the other embodiment.

The drive end cap 100' of FIG. 12 has a drive fitting 140 including an annular sleeve portion 142 that is received within an undercut defined by a reduced diameter outer surface 144 at the extreme end portion of the roll end 132. Spring coils 110a, 110b, and 110c clamp over a round outer surface 146 of the sleeve portion with the same diameter as the round outer surface 138 of the roll. An end wall 148 of drive fitting 140 closes the sleeve portion 142 and has a stud shaft 150 supporting a toothed drive component in the form of a chain sprocket 152 through which the roll 130 is rotatably driven by a schematically indicated chain 154 to convey glass over its upper side.

While preferred embodiments of the springs end cap have herein been described in detail, those familiar with the art will recognize various alternative designs and embodiments for practicing the present invention as defined by the following claims.

What is claimed is:

1. In a glass conveyor roll of ceramic with an axially elongated shape having opposite ends and a rigid intermediate glass conveying portion of a round cross section extending therebetween, and wherein each roll end has a round outer surface and an end cap thereon comprising: at least one helical spring having metallic coils that receive the associated roll end; said coils having round inner surfaces with diameters in an undeflected condition slightly less than the diameter of the associated roll end outer surface and being deflected to increase the inner surface diameters thereof so as to receive the associated roll end prior to being released and thereby clamped over the roll end outer surface received thereby; and the coils having round outer friction drive surfaces for frictionally driving the roll.

2. An end cap as in claim 1 wherein the round inner surface of the coils have cylindrical shapes for clamping over the roll end outer surfaces.

3. In a glass conveyor roll of ceramic with an axially elongated shape having a rigid intermediate glass conveying portion of a round cross section and including an end with a round outer surface, an end cap on the roll end comprising: at least one helical spring having metallic coils that receive the roll end; said coils having round inner surfaces with diameters in an undeflected condition slightly less than the diameter of the roll end outer surface and being deflected to increase the inner surface diameters thereof so as to receive the roll end prior to being released and thereby clamped over the roll end outer surface; the coils having round outer friction drive surfaces for frictionally driving the roll; the coils having axially facing flat surfaces engaged with each other; and the inner and outer round surfaces of each coil having cylindrical shaped extending between the axially facing surfaces.

4. An end cap as in claim 1 wherein the roll end outer surface has a diameter less than the rest of the roll and defines an undercut that receives the coils, and the outer friction drive surfaces each having a diameter equal to the diameter of the rest of the roll with the coils clamped on the roll end.

5. In a glass conveyor roll of ceramic with an axially elongated shape having a rigid intermediate glass conveying portion of a round cross section and including an end with a round outer surface, an end cap on the roll end comprising: at least one helical spring having metallic coils that receive the roll end; said coils having round inner surfaces with diameters in an undeflected condition slightly less than the diameter of the roll end outer surface and being deflected to increase the inner surface diameters thereof so as to receive the roll end prior to being released and thereby clamped over the roll end outer surface; the coils having round outer friction drive surfaces for frictionally driving the roll; the roll end outer surface having a diameter less than the rest of the roll and defining an undercut that receives the coils; the outer friction drive surfaces each having a diameter equal to the diameter of the rest of the roll with the coils clamped on the roll end; a drive fitting having a sleeve portion; the roll end outer surface having an end portion including a reduced diameter portion defining a secondary undercut that receives the sleeve portion of the drive fitting; the sleeve portion having a round outer surface with a diameter equal to the diameter of the undercut that receives the coils so as to be clamped thereby to the roll end; and the drive fitting including a positioning pin extending away from the roll end.

6. In a glass conveyor roll of ceramic with an axially elongated shape having a rigid intermediate glass conveyor portion of a round cross section and including an end with a round outer surface, an end cap comprising: a helical spring having metallic coils that receive the roll end; the roll end having a reduced diameter outer surface of a smaller size than the rest of the roll so as to define an undercut in which the coils are received; said coils having round inner surfaces with cylindrical shapes having diameters in an undeflected condition slightly less than the diameter of the roll end outer surface at the undercut; the coils being deflected to increase the inner surface diameters thereof so as to receive the roll end within the undercut prior to being released and thereby clamped over the roll end outer surface within the undercut; said coils having axially facing flat surfaces engaged with each other; and the coils having round outer friction drive surfaces of cylindrical shapes for frictionally driving the roll, said round outer surfaces extending between the axially facing flat surfaces with the same diameter in the clamped condition as the glass conveying roll portion.

7. In a glass conveyor roll of ceramic with an axially elongated shape having a rigid intermediate glass conveyng portion of a round cross section and including an end with a round outer surface, an end cap comprising: a helical spring having metallic coils that receive the roll end; the roll end having a reduced diameter outer surface of a smaller size than the rest of the roll so as to define a main undercut in which the coils are received and also having an extreme end portion defining a secondary undercut; a drive fitting having a sleeve portion received within the secondary undercut and a positioning pin extending away from the roll end; the sleeve portion having a round outer surface of the same diameter as the roll end outer surface within the main undercut; said coils having round inner surfaces of cylindrical shapes with diameters in an undeflected condition slightly smaller than the sleeve portion and the roll end outer surface within the main undercut; the coils being deflected to increase the inner surface diameters thereof so as to receive the sleeve portion and the roll end within the main undercut prior to being released and thereby clamped thereover to secure the drive fitting to the roll end; said coils having flat axially facing surfaces engaged with each other; and the coils having round outer friction drive surfaces of cylindrical shapes for frictionally driving the roll, said outer surfaces extending between the axially facing surfaces with the same diameter as the glass conveying roll portion in the clamped condition on the roll end.

8. In a glass conveyor roll of ceramic with an axially elongated shape having a rigid intermediate glass conveying portion of a round cross section and including an end with a round outer surface having an undercut therein, an end cap comprising: a drive fitting having a sleeve portion received within the undercut of the roll end and including an axially projecting drive member extending away from the roll end; the sleeve portion of the drive fitting having a round outer surface with the same diameter as the round outer surface of the roll end; at least one helical spring having metallic coils that receive the roll end and the sleeve portion of the drive fitting; and said coils having round inner surfaces with diameters in an underflected condition slightly less than the round outer surfaces of the roll end and the sleeve portion of the drive fitting, said coils being deflected to increase the diameters thereof as the roll end and drive fitting sleeve portion are received thereby prior to being released and clamped thereover to secure the drive fitting to the roll.

9. An end cap as in claim 8 wherein the drive member includes a gear.

10. An end cap as in claim 8 wherein the drive member includes a chain sprocket.

11. An end cap as in claim 8 wherein the coils have flat axially facing surfaces engaged with each other, and the round inner surfaces of the coils having cylindrical shapes extending between the engaged axially facing surfaces.

12. In a glass conveyor roll of ceramic with an axially elongated shape having a rigid intermediate glass conveying portion of a round cross section and including an end with a round outer surface having an undercut therein, an end cap comprising: a drive fitting having a sleeve portion received within the undercut of the roll end and including an axially projecting drive member extending away from the roll end; the sleeve portion of the drive fitting having a round outer surface with the same diameter as the round outer surface of the roll end; a helical spring having metallic coils that receive the roll end and the sleeve portion of the drive fitting; said coils having round inner surfaces of cylindrical shapes with diameters in an undeflected condition slightly less than the round outer surfaces of the roll end and the sleeve portion of the drive fitting; the coils being deflected to increase the diameters thereof as the roll end and drive fitting sleeve portion are received thereby prior to being released and clamped thereover to secure the drive fitting to the roll; and said coils having axially facing surfaces engaged with each other.

13. In a glass conveyor roll of ceramic with an axially elongated shape of a round cross section and having an end that has broken at a fracture, an end cap comprising: at least three helical springs having metallic coils that are axially threaded with each other; each spring coil having a round inner surface with a diameter slightly less than the diameter of the roll; the spring coils being deflected to increase the diameters thereof so as to receive the broken roll end at the fracture prior to being released to clamp thereover; and certain of the coils extending axially across the fracture in a circumferentially spaced relationship so as to cooperate with the other coils in fixing the broken roll end to the rest of the roll.

14. An end cap as in claim 13 wherein the spring coils have axially facing flat surfaces engaged with each other, and the inner coil surfaces having cylindrical shapes extending between the engaged axially facing surfaces.

15. An end cap as in claim 13 wherein the roll end includes a reduced diameter surface portion defining an undercut that receives the coils, the coils having round outer friction drive surfaces for frictionally driving the roll, and the friction drive surfaces having the same diameter as the rest of the roll inward from the roll end.

16. An end cap as in claim 13 further including a drive fitting having a sleeve portion, an undercut in the roll end that receives the sleeve portion of the drive fitting, the sleeve portion having a round outer surface of the same diameter as the rest of the roll adjacent the roll end so as to be clamped by the coils, and the drive fitting having a drive member projecting away from the roll end.

17. In a glass conveyor roll of ceramic with an axially elongated shape of a round cross section and having an end that includes a reduced diameter undercut, the roll end being broken at a fracture, an end cap comprising: three helical springs having metallic coils that are axially threaded with each other; each spring coil having a round inner surface of a cylindrical shape with a diameter slightly less than the diameter of the undercut; the spring coils being deflected to increase the diameters thereof so as to receive the broken roll end at the fracture prior to being released to clamp thereover within the undercut; certain of the coils extending axially across the fracture in a circumferentially spaced relationship so as to cooperate with the other coils in fixing the broken roll end to the rest of the roll; the coils having flat axially facing surfaces engaged with each other; and the coils having round outer friction drive surfaces of cylindrical shapes with the same diameters as the roll adjacent the undercut roll end.

18. In a glass conveyor roll of ceramic with an axially elongated shape of a round cross section and having an end that includes a reduced diameter undercut, the roll end being broken at a fracture, an end cap comprising: three helical springs having metallic coils that are axially threaded with each other; a drive fitting having a sleeve portion received within the undercut and a drive member projecting away from the roll end; the sleeve portion having a round outer surface with the same diameter as the roll end; each spring coil having a round inner surface of a cylindrical shape with a diameter slightly less than the diameter of the roll end; the spring coils being deflected to increase the diameters thereof so as to receive the sleeve portion and the broken roll end at the fracture prior to being released to clamp thereover and secure the drive fitting; certain of the coils extending axially across the fracture in a circumferentially spaced relationship so as to cooperate with the other coils in fixing the broken roll end to the rest of the roll; and the coils having flat axially facing surfaces engaged with each other.

* * * * *

UNITED STATES PATENT AND TRADEMARK OFFICE
CERTIFICATE OF CORRECTION

PATENT NO. : 4,140,486
DATED : February 20, 1979
INVENTOR(S) : Norman C. Nitschke It is certified that error appears in the above-identified patent and that said Letters Patent are hereby corrected as shown below:

Column 1, line 67, after "each" insert --end--.
Column 2, line 37, "spirng" should be --spring--.
Column 4, line 8, "end" should be --ends--.
Column 5, line 48, "stud" should be --stub--.
Column 5, line 67, after "extending" insert --upwardly--.
Column 6, line 59, after "least" insert --three--.
Column 7, line 22, "stud" should be --stub--.
Column 7, line 27, "springs" should be --spring--.
Column 7, line 51, "surfaces" should be --surface--.
Column 7, line 67, "shaped" should be --shapes--.
Column 8, lines 35 & 36, "conveyor" should be --conveying--.
Column 8, lines 57 & 58, "conveyng" should be --conveying--.

Signed and Sealed this

Fifth Day of June 1979

[SEAL]

Attest:

RUTH C. MASON
Attesting Officer

DONALD W. BANNER
Commissioner of Patents and Trademarks